US011908269B2

(12) United States Patent
Huke et al.

(10) Patent No.: US 11,908,269 B2
(45) **Date of Patent: *Feb. 20, 2024**

(54) ODDS MAKING THROUGH CONTEXT SPECIFIC SIMULATIONS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,163

(22) Filed: Jul. 8, 2022

(65) Prior Publication Data

US 2022/0343723 A1 Oct. 27, 2022

Related U.S. Application Data

(63) Continuation of application No. 17/386,960, filed on Jul. 28, 2021, now Pat. No. 11,386,746.

(60) Provisional application No. 63/121,401, filed on Dec. 4, 2020.

(51) Int. Cl.
*G07F 17/32* (2006.01)

(52) U.S. Cl.
CPC ...... *G07F 17/3227* (2013.01); *G07F 17/3288* (2013.01)

(58) Field of Classification Search
CPC ......................... G07F 17/3227; G07F 17/3288
See application file for complete search history.

*Primary Examiner* — Kevin Y Kim
(74) *Attorney, Agent, or Firm* — Maier & Maier, PLLC

(57) ABSTRACT

A method of calculating odds by running simulations for the game from the current point so that the simulations would reduce the number of possible outcomes because a portion of the game will have already been played.

10 Claims, 4 Drawing Sheets

System for odds making through context-specific simulations

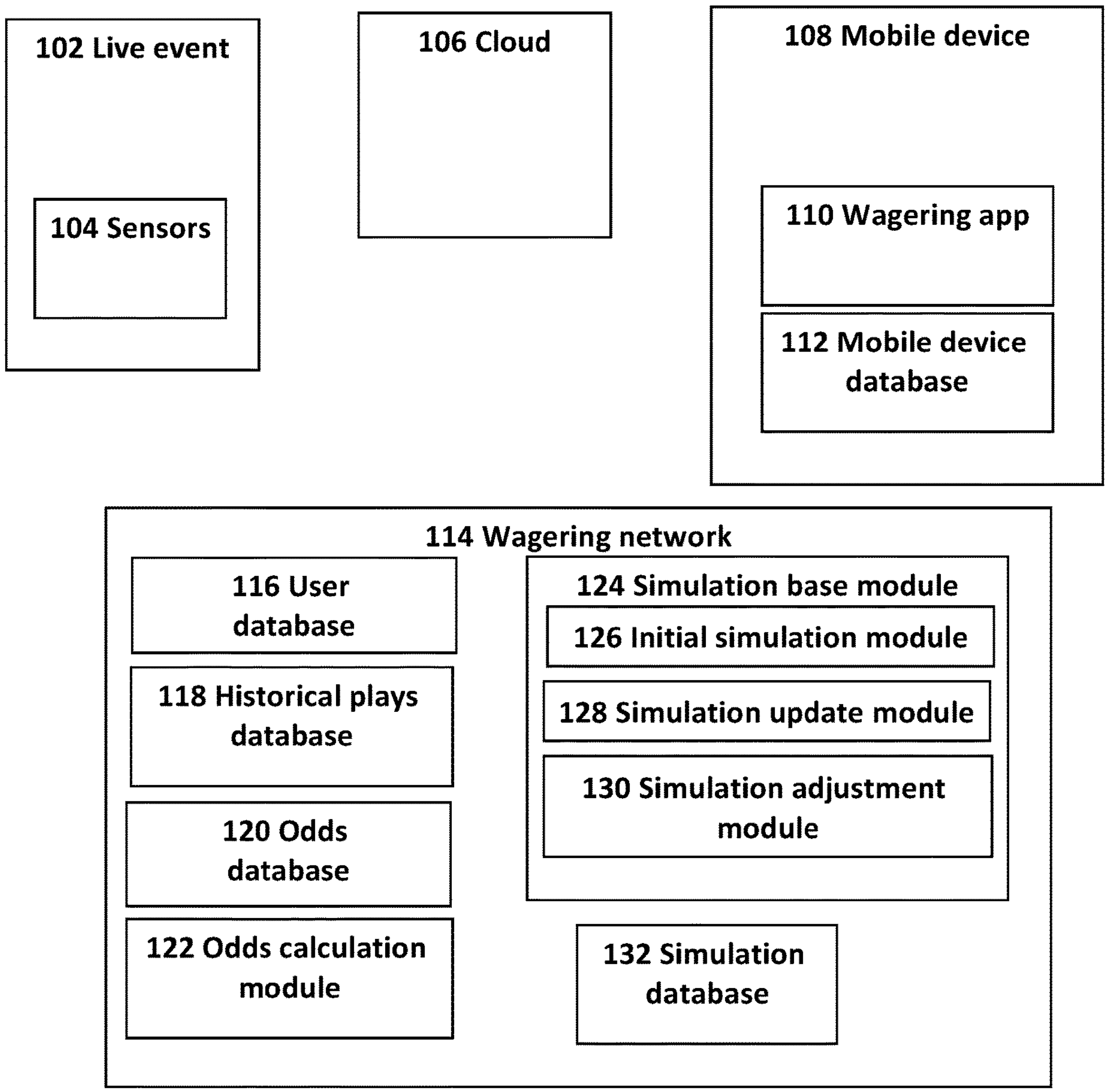
Fig.1 System for odds making through context-specific simulations

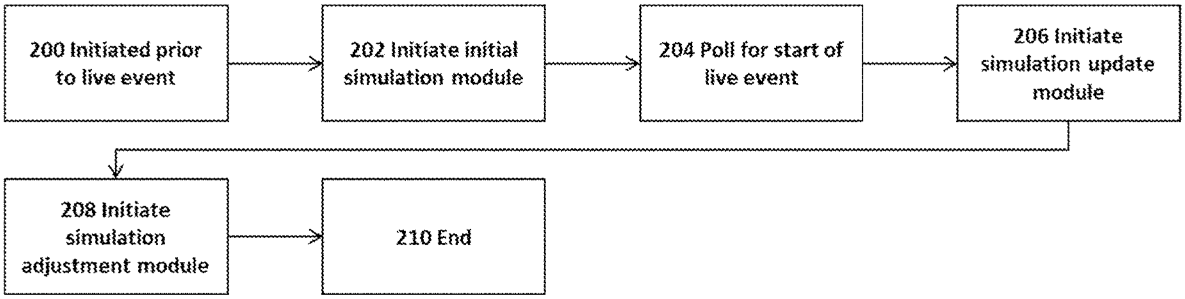
Fig.2 Simulation base module
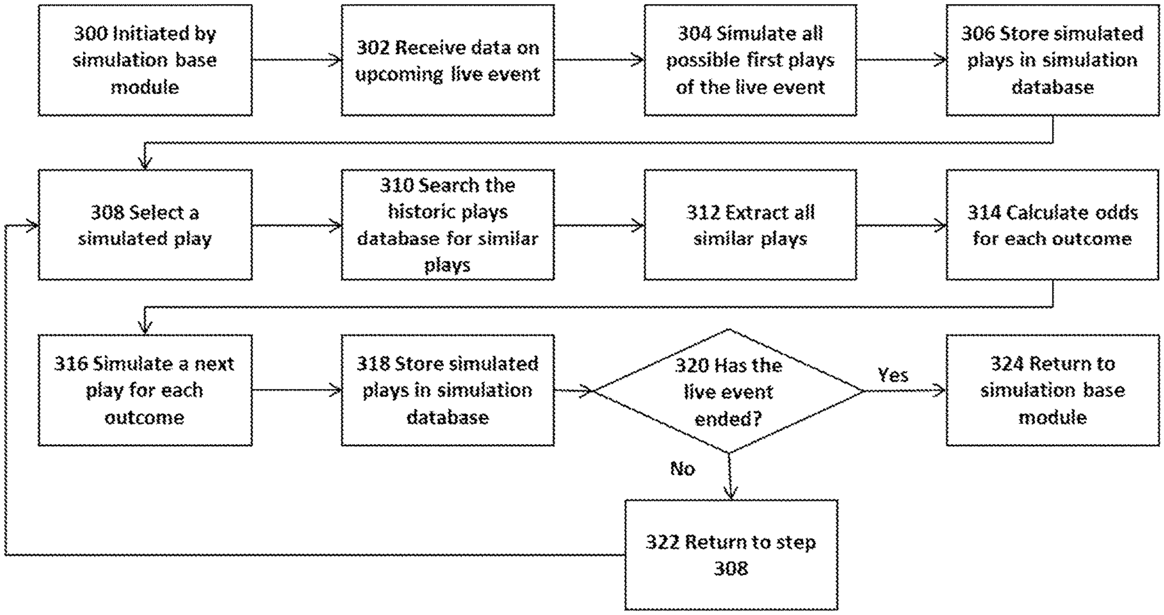
Fig.3 Initial simulation module

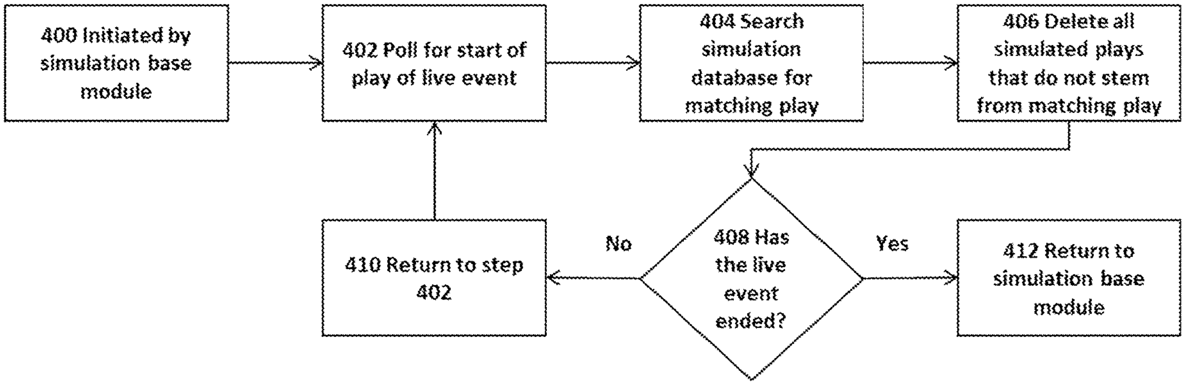
Fig.4 Simulation update module
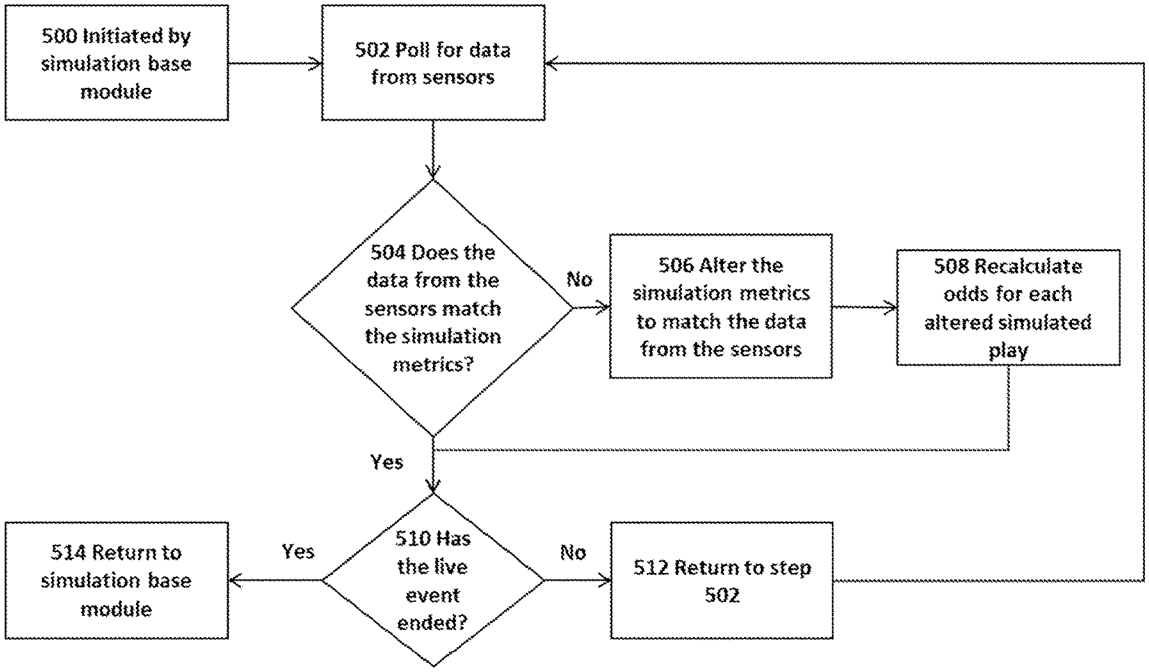
Fig.5 Simulation adjustment module

| Simulated Play ID | Parameter 1 (Pitcher) | Parameter 2 (Inning) | ... | Parameter N (wind vector) | Outcome 1 | Outcome 1 odds | Outcome 1 Play ID | ... | Outcome N | Outcome N odds | Outcome N Play ID |
|---|---|---|---|---|---|---|---|---|---|---|---|
| A1 | Spencer Turnbull | 1 | ... | 5mph NE | Strike | 27% | A1A1 | ... | Ball | 7% | A1A7 |
| A2 | Tyler Alexander | 1 | ... | 5mph NE | Strike | 29% | A2A1 | ... | Ball | 11% | A2A6 |
| ... | ... | ... | ... | ... | ... | ... | ... | ... | ... | ... | ... |
| A1A1 | Spencer Turnbull | 1 | ... | 5mph NE | Single | 21% | A1A1A1 | ... | Homerun | 4% | A1A1A8 |
| - | - | - | ... | - | - | - | - | ... | - | - | - |
| - | - | - | ... | - | - | - | - | ... | - | - | - |

Fig.6 Simulation database

ODDS MAKING THROUGH CONTEXT SPECIFIC SIMULATIONS

CROSS-REFERENCE TO RELATED APPLICATIONS

The present patent application claims benefit and priority to U.S. patent application Ser. No. 17/386,960, filed Jul. 28, 2021 which claims the benefit and priority to U.S. Provisional Patent Application No. 63/121,401 entitled "ODDS MAKING THROUGH CONTEXT SPECIFIC SIMULATIONS" filed on Dec. 4, 2020 which is hereby incorporated by reference into the present disclosure.

FIELD

The embodiments are generally related to play-by-play wagering on live sporting events.

BACKGROUND

Calculating odds in real-time for every single play of a sporting event is a time-sensitive and processing power-intensive task. In some sports, the time between plays can be less than thirty seconds on average.

Due to the small amount of time between some plays in a sporting event, giving the algorithms that calculate odds time to work may require that odds calculation one or more plays in advance. The results of the future plays must be simulated so that odds can be calculated for possible plays.

A problem that arises when plays are simulated is that the number of possible future plays increases exponentially. Therefore, there is a need to reduce the number of possible future plays to save on time and processing power.

SUMMARY

Embodiments can include methods and systems for odds making through context specific simulations. In one embodiment, a method of calculating odds with multiple simulations for a play-by-play wagering network may be provided. The method can include collecting real-time sensor data from a live sporting event upon which play-by-play wagers can be placed; calculating odds for wagers placed on the live sporting even through the play-by-play wagering network based on historical play data; generating a plurality of simulations for outcomes of plays within the live sporting event; and updating the odds for wagers placed on the live sporting event through the play-by-play wagering network based on the plurality of simulations for outcomes of plays within the live sporting event.

In another embodiment, a system for calculating odds with multiple simulations for a play-by-play wagering network can include a play by play wagering network; one or more sensors that collect real-time sensor data from the live sporting event upon which play-by-play wagers can be placed on the play-by-play wagering network; a historical plays database which contains historical plays data for live sporting events; an odds calculation module that calculates odds for the wagers placed on the live sporting event based on the historical plays data; an initial simulation module which generates a plurality of simulations for outcomes of plays within the live sporting event; and a simulation adjustment module which updates the odds for wagers placed on the live sporting event through the play-by-play wagering network based on the plurality of simulations for outcomes of plays within the live sporting event.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for odds making through context-specific simulations, according to an embodiment.

FIG. 2: illustrates a simulation base module, according to an embodiment.

FIG. 3: illustrates an initial simulation module, according to an embodiment.

FIG. 4: illustrates a simulation update module, according to an embodiment.

FIG. 5: illustrates a stimulation adjustment module, according to an embodiment.

FIG. 6: illustrates a simulation database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for odds making through context-specific simulations. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical plays data to calculate odds for in-play wagers.

Further, embodiments may include a simulation base module 124. The simulation base module 124 may initiate an initial simulation module 126 to create an initial simulation of the live event 102 based on data in the historical plays database 118. The simulation base module 124 may initiate a simulation update module 128 to update the initial simulation based on the current state of the live event 102. The simulation base module 124 may initiate a simulation adjustment module 130 to adjust the initial simulation based on the variance between expected metrics and the reality of the live event 102.

Further, embodiments may include the initial simulation module 126, which may simulate a set of possible plays for the live event 102 based on historical data. The simulated plays may be stored in a simulation database 132.

Further, embodiments may include the simulation update module 128, which may remove impossible outcomes from the initial simulation based on the current state of the live event 102. For example, if the beginning coin flip of an American football game was heads, then all simulations where the result of the coin flip was tails may be discarded.

Further, embodiments may include the simulation adjustment module 130, which may adjust the simulation based on the variance between predicted metrics and the reality of the live event 102. For example, if a pitcher in a baseball game is pitching below or above their historical average, the simulation may adjust to compensate for the variance.

Further, embodiments may include the simulation database 132, which may store the simulation created by the initial simulation module 126. The simulation database may be accessed and altered by the simulation update module 128. Data in the simulation database 132 may be used to calculate odds by the odds calculation module 122.

FIG. 2 illustrates the simulation base module 124. The process may begin with initiation of the simulation base module 124, at step 200, before the start of the live event 102. The simulation base module 124 may be initiated manually by an administrator of the system or another module. The simulation base module 124 may be initiated once enough data has been collected to make accurate simulations, for example, when the player line-up for the live event 102 is finalized. The simulation base module 124 may initiate, at step 202, the initial simulation module 126. The initial simulation module 126 may create a set of possible outcomes for each play of the live event 102. The simulation base module 124 may poll, at step 204, for the start of the live event 102. The simulation base module 124 may initiate, at step 206, the simulation update module 128. The simulation update module 128 may update the initial simulation based on the current state of the live event 102. The simulation base module 124 may initiate, at step 208, the simulation adjustment module 130. The simulation adjustment module 130 may adjust the metrics used in the initial simulation based on how those metrics vary from the live event 102. Changing the metrics may alter the odds of one or more simulated plays in the simulation database 132. The simulation base module 124 may end at step 210. The simulation base module 124 may wait for all initialized modules to return to the simulation base module 124 before ending.

FIG. 3 illustrates the initial simulation module 126. The process may begin with initiation of the initial simulation module 126, at step 300, by the simulation base module 124. The initial simulation module 126 may receive, at step 302, data on the upcoming live event 102. This data may be entered manually by an administrator, retrieved from a database, or sent by another module. The initial simulation module 126 may simulate, at step 304, all possible first plays of the live event 102. The simulated plays may be possible states of the live event 102 at the beginning of the first play. For example, if the live event 102 is a baseball game, a possible first play may list the expected opening pitcher against the expected opening batter. Other possible plays may include listing a different pitcher against the expected opening batter or listing the expected opening pitcher against a different batter. The initial simulation module 126 may store, at step 306, the simulated plays in the simulation database 132. The initial simulation module 126 may select, at step 308, a simulated play in the simulation database 132. Simulated plays that occur earlier in the live event 102 may be prioritized. For example, the initial simulation module 126 may not select a second play of the live event 102 until all simulated first plays have been selected. The initial simulation module 126 may search, at step 310, the historical plays database 118 for plays with parameters similar to the selected simulated play of the live event 102. The similar parameters may not have to be an exact match. For example, two plays with the same team and players may be considered similar even though the weather may differ. A similar play may be one in which players with similar traits participated. For example, a similar play may be defined as the current pitcher against other left-handed batters or the current pitcher against left-handed batters with a normalized on-base plus slugging percentage (OPS+) between 105 and 115, or within one standard deviation of the current batter. Identifying cohorts of players with similar characteristics may allow the system to examine a larger sample size of data related to other context characteristics of the play, such as temperature, park factor, wind direction, etc. An administrator of the system or another module may adjust which plays are considered similar. The initial simulation module 126 may extract, at step 312, all similar plays from the historical plays database 118. The initial simulation module 126 may calculate, at step 314, odds for the outcome of the simulated play using the extracted similar plays. For example, if 100 similar plays are extracted and 27 resulted in a strike, while the other 73 resulted in another outcome, the odds for a strike would be calculated as 27%. The initial simulation module 126 may simulate, at step 316, a next play of the live event 102 for each outcome. For example, if an outcome of the first play of the game is a strike, then the simulated second play of the game may have all the same parameters except that the number of strikes would be increased by one. Other parameters such as time, temperature, wind speed, etc., may be estimated based on the average time of a play and the amount each parameter may change from play to play. Outcomes with a minute chance of occurring, for example, <1%, may be excluded. The initial simulation module 126 may store, at step 318, the simulated plays in the simulation database 132. The initial simulation module 126 may determine, at step 320, if the live event 102 has ended by obtaining data from the sensors 104 or as manually determined by an administrator. The initial simulation module 126 may check if the live event 102 has ended after each prior step. The initial simulation module 126 may also determine if there are no more plays to simulate. If the live event 102 has not ended, the initial simulation module 126 may return, at step 322, to step 308. The initial simulation module 126 may return, at step 324, to the simulation base module 124.

FIG. 4 illustrates the simulation update module 128. The process may begin with the simulation update module 128 being initiated, at step 400, by the simulation base module 124. The simulation update module 128 may poll, at step 402, for the start of a play of the live event 102. This information may be obtained from the sensors 104 at the live event 102. The simulation update module 128 may search, at step 404, the simulation database 132 for a simulated play that matches the actual state of the live event 102. A matched play may not require the same parameters to be considered as a match. For example, if all of a play's parameters except wind speed match, but wind speed is within two mph of the simulated wind speed, it may be considered as a match. If more than one play is a match, the simulation update module 128 may select the simulated play that closely matches the live event 102. The simulation update module 128 may delete, at step 406, all simulated plays in the simulation database 132 that do not stem from the matching play. This is done by checking which simulated play IDs omit the matching simulated play ID. For example, if the matching play ID is A2, then simulated plays with a simulated play ID that does not begin with A2 may be discarded. The simulation update module 128 may determine, at step 408, if the live event 102 has ended by obtaining information from the sensors 104 at the live event 102. If the live event 102 has not ended, the simulation update module 128 may return, at step 410, to step 402. If the live event 102 has ended, the simulation update module 128 may return, at step 412, to the simulation base module 124.

FIG. 5 illustrates the simulation adjustment module 130. The process may begin with the simulation adjustment module 130 being initiated, at step 500, by the simulation base module 124. The simulation adjustment module 130 may poll, at step 502, for data from the sensors 104 at the live event 102. The simulation adjustment module 130 may determine, at step 504, if the data from the sensors 104 matches the metrics used to simulate plays. For example, if the initial simulation module 126 used historical weather data to predict an average wind vector of five mph NE for the first inning of a baseball game and the data from the sensors 104 indicates that the actual wind vector is ten mph SE, the simulation adjustment module 130 may determine that this is not a match. The match may not need to be an exact match. The simulation adjustment module 130 may ignore insignificant discrepancies, such as a one mph wind speed difference. The simulation adjustment module 130 may require a collection of data over several plays—which show consistent differences between the collected data from the sensors 104 and the metrics used to simulate plays—to determine the absence of a match. Differences between discrete outcomes, such as the player at-bat, the pitcher, the loaded bases, etc., are handled by the simulation update module 128. The simulation adjustment module 130 may alter, at step 506, the metrics to match the data from the sensors 104 if the simulation metrics and data from the sensors 104 do not match. For example, if all the possible simulated plays use a wind vector of five mph NE, but the actual wind vector is ten mph SE, then the simulated plays may be altered to have a wind vector of ten mph SE in the simulation database 132. Simulated plays that have been discarded by the simulation update module 128 may be ignored. The simulation adjustment module 130 may recalculate, at step 508, the odds for each simulated play whose metrics were changed. The altered simulated plays may be marked as new simulated plays, and the recalculation may be done by the initial simulation module 126. Alternatively, the simulation adjustment module 130 may calculate the odds and alter those values in the simulation database 132. The simulation adjustment module 130 may use the same method of calculating odds as the initial simulation module 126. If the simulation metrics and data from the sensors 104 match, the simulation adjustment module 130 may determine, at step 510, if the live event 102 has ended. This data may be obtained from the sensors 104 at the live event 102. If the live event 102 has not ended, the simulation adjustment module 130 may return, at step 512, to step 502. If the live event 102 has ended, the simulation adjustment module 130 may return, at step 514, to the simulation base module 124.

FIG. 6 illustrates the simulation database 132. The simulation database 132 may contain data on simulated plays, which may be originally populated by the initial simulation module 126 and may later be altered by the simulation update module 128 and/or simulation adjustment module 130. The simulation database 132 may contain a simulated play ID that identifies the simulated play and may also incorporate the simulated play ID of the prior simulated play. For example, the simulated play ID, "A1A1", contains the simulated play ID, "A1", and the simulated play ID, "A1", of the last play. The simulation database 132 may contain the parameters of the simulated play used by the initial simulation module 126 to calculate the odds of each outcome. These parameters may be altered by the simulation adjustment module 130 to reflect the reality of the live event 102. The simulation database 132 may contain several possible outcomes—with their respective odds—for the simulated play, as well as the simulated play ID of the simulated play that may result from the outcome.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method comprising:
collecting real-time sensor data from a live sporting event;
calculating odds for play-by-play wagers placed on the live sporting event through a play-by-play wagering network based on historical play data;
generating a plurality of simulations for outcomes of plays within the live sporting event; and
updating the odds for the play-by-play wagers placed on the live sporting event through the play-by-play wagering network based on the plurality of simulations for the outcomes of plays within the live sporting event.

2. The method of claim 1, further comprising:
simulating a plurality of next plays of the live event based on the outcome of each play in the live sporting event as determined by the real-time sensor data.

3. The method of claim 2, further comprising:
altering the plurality of simulations of the next plays to match adjustments to the real-time sensor data.

4. The method of claim 3, further comprising:
removing each of the plurality of simulations of the next plays that does not match with the changes to the outcome of each play as determined by the real-time sensor data.

5. The method of claim 4, further comprising:
storing the simulated plays and simulated play parameters in a database.

6. A system comprising:
a play by play wagering network that is configured to acquire real-time data collected from a live sporting event;
a historical plays database that is configured to contain historical plays data for live sporting events;
an odds calculation module that is configured to calculate odds for play-by-play wagers placed on the live sporting event based on the historical plays data;
an initial simulation module that is configured to generate a plurality of simulations for outcomes of plays within the live sporting event; and
a simulation adjustment module that is configured to update the odds for the play-by-play wagers placed on the live sporting event through the play-by-play wagering network based on the plurality of simulations for the outcomes of plays within the live sporting event.

7. The system of claim 6, wherein the initial simulation module is further configured to simulate a plurality of next plays of the live sporting event based on the outcome of each play in the live sporting event as determined by the real-time data.

8. The system of claim 7, wherein the simulation adjustment module is further configured to alter the plurality of next play simulations to match the real-time data.

9. The system of claim 8, further comprising:
a simulation updating module that is configured to remove each of the plurality of next play simulations that does not match changes to the live sporting event as determined by the real-time data.

10. The system of claim 9, further comprising:
a simulation database that is configured to store the simulated plays and simulated play parameters.

* * * * *